(12) United States Patent
Choi et al.

(10) Patent No.: US 8,348,038 B2
(45) Date of Patent: Jan. 8, 2013

(54) DISK FRICTION CLUTCH APPARATUS USING SELF-ENERGIZING EFFECT

(75) Inventors: Seibum Choi, Daejon (KR); Hyung Jin Sung, Daejon (KR); Jinsung Kim, Daejon (KR)

(73) Assignee: Korea Advanced Institute of Science and Technology, Daejon (KR)

(*) Notice: Subject to any disclaimer, the term of this patent is extended or adjusted under 35 U.S.C. 154(b) by 481 days.

(21) Appl. No.: 12/591,370

(22) Filed: Nov. 18, 2009

(65) Prior Publication Data
US 2010/0288595 A1 Nov. 18, 2010

(30) Foreign Application Priority Data
May 18, 2009 (KR) .................. 10-2009-0043294

(51) Int. Cl.
*F16D 23/00* (2006.01)
*F16D 13/48* (2006.01)
*F16H 1/12* (2006.01)

(52) U.S. Cl. ..... 192/20; 192/70.23; 192/82 P; 192/84.6; 192/84.7

(58) Field of Classification Search .............. 192/20, 192/54.5, 54.52, 70.23, 70.24, 54.1, 82 P; 74/842, 33, 46, 89.18, 89.17, 99 A, 120, 406, 74/109
See application file for complete search history.

(56) References Cited

U.S. PATENT DOCUMENTS
5,485,904 A * 1/1996 Organek et al. ............. 192/54.52
5,931,263 A * 8/1999 Ericson et al. ................. 74/422
6,315,096 B1 * 11/2001 Dairokuno et al. ........ 192/54.52
7,344,011 B2    3/2008 Naude
2004/0099500 A1 * 5/2004 Stevenson et al. ......... 192/54.52

FOREIGN PATENT DOCUMENTS
EP       0848178 B1    6/2001

OTHER PUBLICATIONS

KSAE 2008 Annual Conference Proceedings, Nov. 19, 2008, Korean Society of Automotive Engineers, 2008 KSAE Conference Materials, Published on Nov. 19, 2008 by KSAE.

* cited by examiner

*Primary Examiner* — Rodney Bonck
(74) *Attorney, Agent, or Firm* — Bacon & Thomas, PLLC

(57) ABSTRACT

A disk friction clutch apparatus using a self-energizing effect is disclosed. The clutch apparatus includes a drive friction disk connected to a drive shaft, a driven friction disk connected to a driven shaft, a push member configured to press the driven friction disk against the drive friction disk at an engagement position of a clutch, and an operation unit configured to shift the push member from the release position of the clutch to the engagement position. The operation unit is operated to increase a force of the push member to press the driven friction disk when the push member located at the engagement position of the clutch receives a force of rotating the drive shaft. Since the clutch apparatus employs a self-energizing effect, it is possible to fasten the clutch with a small force.

15 Claims, 9 Drawing Sheets

DISK FRICTION CLUTCH APPARATUS USING SELF-ENERGIZING EFFECT

CROSS-REFERENCE TO RELATED APPLICATION

This application claims the benefit of Korean Patent Application No. 10-2009-0043294 filed on May 18, 2009, the disclosure of which is hereby incorporated herein by reference in its entirety.

BACKGROUND OF THE INVENTION

1. Field of the Invention

The present invention relates to a disk friction clutch apparatus using a self-energizing effect, and more particularly, to a disk friction clutch apparatus, as a clutch apparatus disposed in a transmission of a power train used in an automobile, capable of operating a clutch with a small capacity motor only, not a hydraulic pressure, using a self-energizing effect.

2. Description of the Related Art

Clutches for automobile transmissions generally employ wet-type clutches operated in a state in which the clutches are submerged in fluid. In particular, the wet-type clutches are widely used in automatic transmissions. While the wet-type clutches have advantages of smooth gear shift and good lubrication and cooling, efficiency may decrease more or less due to power loss. As another type of clutches, a disk friction clutch including a friction disk, a pressure plate, etc., is widely applied to a manual transmission and an automated manual transmission. Such a disk friction clutch generally uses a hydraulic pressure for driving.

In recent times, in order to improve fuel efficiency, convenience, driving efficiency, etc., together with efforts to improve a conventional continuously variable transmission, development and utilization of dual clutch transmissions, in which advantages of manual and automatic transmissions are combined, and automated manual transmissions, etc., have been actively performed. While novel types of transmissions have advantages of improving fuel efficiency, a gear shift time may increase, deteriorating clutching performance and shift quality.

Methods of solving the problems may be generally classified into two types: first, development of an effective control algorithm to control a transmission, and second, improvement of a clutch mechanism.

Meanwhile, most of these novel types of transmissions use hydraulic apparatus, and only some of them use motors. When the hydraulic apparatus are used, the structure of the transmission is complicated and thus manufacturing cost also increases. The reason of using the hydraulic pressure is that a relatively large force can be generated. However, since the clutch may be operated with a small force using a self-energizing effect, the motor may be used, rather than the hydraulic apparatus.

U.S. Pat. No. 7,344,011 discloses a self-energizing clutch using inclined surfaces of wedge-shaped members to increase a clamping force of the clutch. However, the clutch may increase friction due to direct contact of surfaces thereof. U.S. Pat. No. 5,180,141 discloses a clutch driver using a ball ramp. The clutch driver has an operation ring and a control ring each of which has a groove with a circumferentially inclined surface such that balls are roll in the grooves, thereby providing a self-energizing effect. While three or four balls are required to operate the driver, the clutch may not be smoothly engaged when each ball is not in position. In addition, since the balls roll and slide on the inclined surfaces, it is difficult to ensure precise proportional control of the clamping force of the clutch.

SUMMARY OF THE INVENTION

The present invention, therefore, solves aforementioned problems associated with conventional devices by providing a disk friction clutch having a novel structure capable of increasing the performance of a transmission.

It is another aspect of the present invention to provide a disk friction clutch capable of simplifying the structure thereof using a motor as a drive source, rather than a hydraulic apparatus, and reducing the manufacturing cost of the clutch. In particular, it is another aspect of the present invention to provide a clutch mechanism in which a clamping force of the clutch can be obtained even using a small motor of 12V, which is generally used in an automobile.

In an exemplary embodiment of the present invention, a disk friction clutch apparatus using a self-energizing effect includes a drive friction disk connected to a drive shaft and rotated by the drive shaft; a driven friction disk connected to a driven shaft to axially move with respect to the driven shaft and configured to receive torque from the drive friction disk to transmit the torque to the driven shaft at an engagement position of the clutch; a push member connected to the driven shaft to be rotated about the driven shaft and move in an axial direction thereof, and configured to press the driven friction disk against the drive friction disk at the engagement position of the clutch; and a self-energizing operation unit configured to rotate the push member at a release position of the clutch in a first rotation direction and move the push member toward the driven friction disk in the axial direction to return the push member to the engagement position of the clutch, and to increase a force of the push member against the driven friction disk when the push member at the engagement position of the clutch is pressed to rotate in the first rotation direction from the driven friction disk.

A novel clutching mechanism according to the present invention can engage a clutch with a small magnitude of force using a self-energizing effect.

BRIEF DESCRIPTION OF THE DRAWINGS

The above and other features of the present invention will be described in reference to certain exemplary embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Detailed illustrative embodiments are disclosed herein. However, specific structural and functional details disclosed herein are merely representative for purposes of describing example embodiments. This invention, however, may be embodied in many alternate forms and should not be construed as limited to only example embodiments set forth herein.

Figure 1:
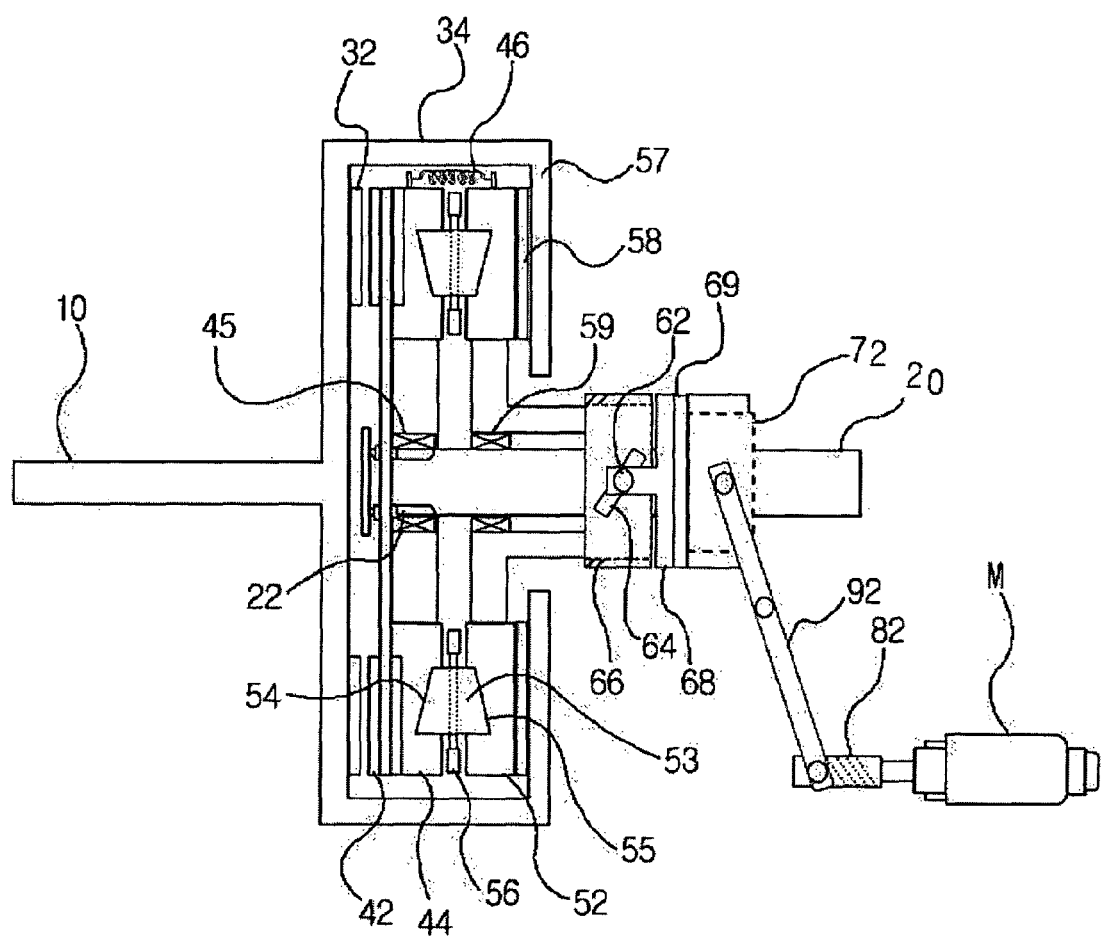
FIGS. 1 and 2 are views showing a clutch apparatus in accordance with an exemplary embodiment of the present invention.
Figure 2:
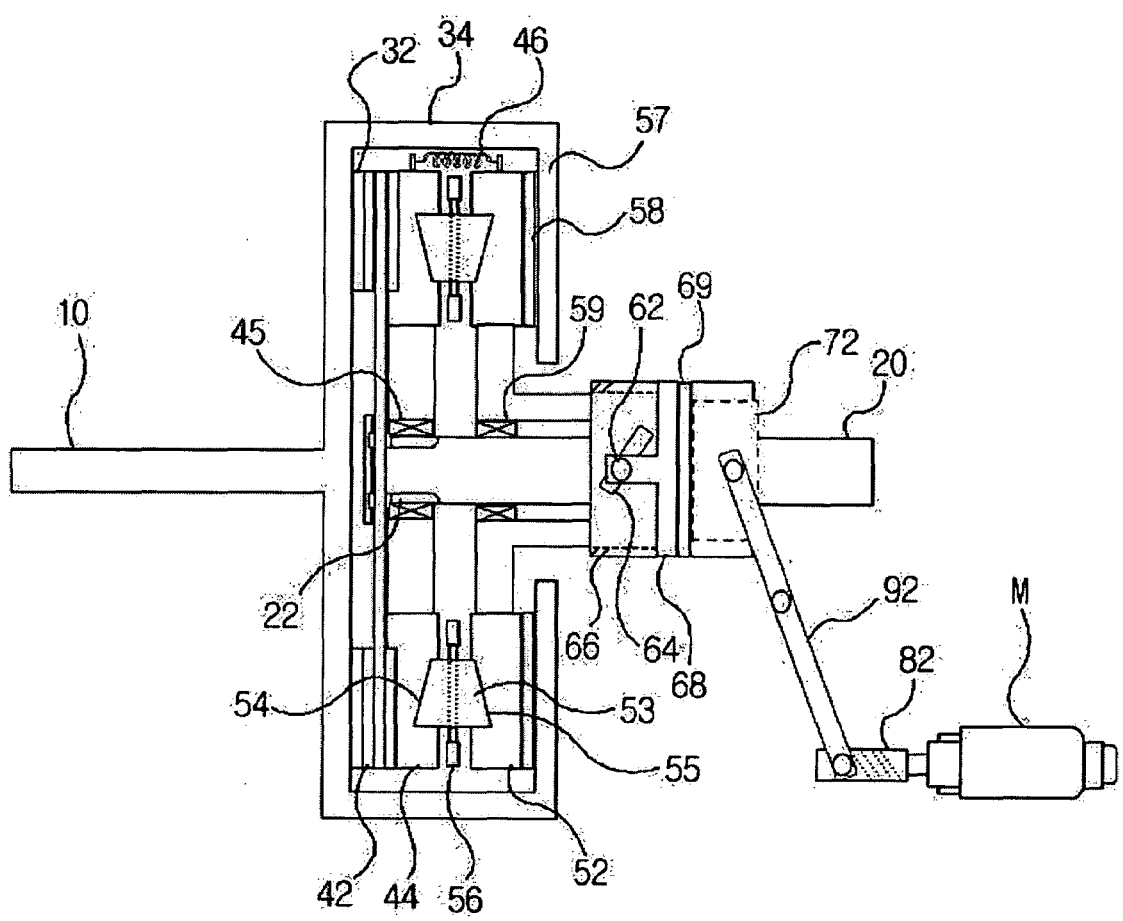

FIGS. 1 and 2 are views showing a disk friction clutch apparatus in accordance with an exemplary embodiment of the present invention at a release position and an engagement position, respectively. The clutch apparatus includes a housing 34 connected to a drive shaft 10, a drive friction disk 32, a driven friction disk 42, a push member 44, an operation unit, and a motor M for driving the operation unit. In this specification, the term "release position" of the clutch means a position at which the respective components of the clutch are arranged when the friction disks 32 and 42 are spaced apart from each other not to transmit torque, and the term "engagement position" of the clutch means a position at which the respective components of the clutch are arranged when the friction disks 32 and 42 are engaged with each other to transmit torque.

The drive friction disk 32 is coupled to the drive shaft 10 to be rotated in the same direction as the drive shaft 10. The driven friction disk 42 is coupled to a driven shaft 20 to move in an axial direction of the driven shaft 20. At the release position of the clutch shown in FIG. 1, the driven friction disk 42 is maintained spaced apart from the drive friction disk 32, and at the engagement position of the clutch shown in FIG. 2, the driven friction disk 42 is engaged with the drive friction disk 32 to receive torque from the drive friction disk 32 and then transmit the torque to the driven shaft 20. For example, as shown, the driven shaft 20 has a spline 122 such that the driven friction disk 42 can axially move along the spline 122 to transmit torque to the driven shaft 20.

The push member 44 is connected to the driven shaft 20 to be rotated about the driven shaft 20 and move in the axial direction of the driven shaft 20. The push member 44 presses the driven friction disk 42 against the drive friction disk 32 at the engagement position (see FIG. 2) of the clutch. In this embodiment, the push member 44 has a disk-like shape and is connected to the driven shaft 30 via a bearing to be rotated about the driven shaft 20.

The operation unit rotates the push member 44 positioned at the release position of the clutch shown in FIG. 1 in the same direction as the drive friction disk 32 and axially moves it toward the driven friction disk 42 to shift it to the engagement position of the clutch shown in FIG. 2. In addition, the operation unit increases a force applied by the push member 44 to press the driven friction disk 42 when the driven friction disk 42 applies a force to the push member 44 to rotate the drive friction disk 32 in the rotation direction at the engagement position of the clutch. That is, the operation unit provides a self-energizing effect. The self-energizing effect of the clutch apparatus in accordance with an exemplary embodiment of the present invention will be described below in detail.

The operation unit includes an operation disk 52, first and second rack gears 54, a pinion 53, and a driver having a motor.

The operation disk 52 cannot axially move but is rotatably connected to the driven shaft 20. For this purpose, a thrust bearing is provided between the driven shaft 20 and the operation disk 52 such that the operation disk 52 can be rotated but cannot move toward the drive friction disk 32. In addition, in order to restrict movement of the operation disk 52 in a direction away from the drive friction disk 32, a support of the operation disk 52 is provided. The support of the operation disk 52 is spaced apart a predetermined distance from the drive friction disk 32 and connected to the operation disk 52 via a bearing.

A plurality of first rack gears 55 formed on a surface of the operation disk 52 facing the push member 44. The first rack gears 55 are formed on a circumference of the operation disk 52 having a certain radius from a center thereof on a surface inclined with respect to the surface of the operation disk 52. In order to stably operate the clutch apparatus, three or more first rack gears 55 may be provided.

A plurality of second rack gears 54 are formed on a surface of the push member 44 facing the operation disk 52. The second rack gears 54 are formed on a circumference of the push member 44 having a certain radius from a center thereof on a surface inclined with respect to the surface of the push member 44. The inclined surface of the second rack gears 54 is formed to be parallel to the inclined surface of the first rack gears 55. The same number of second rack gears 54 as the first rack gears 55 are formed at the surface of the push member 44.

The pinions 53 are disposed in the spaces defined by the first rack gears 55 provided at the operation disk 52 and the second rack gears 54 provided at the push member 44, respectively. The respective pinions 53 are in engagement with the first and second rack gears 54 and 55. The center axes 56 of the respective pinions 53 are disposed toward the center of the push member 44 or the operation disk 52. The respective pinions 53 have a bevel gear shape with an end near the center of the push member 44 or the operation disk 52 having a diameter smaller than that of the opposite end far therefrom. The reason for this is that since the pinions 53 are rotated in the spaces defined by the rack gears 54 and 55 disposed along the circumference, a moving distance of the end near the center is different from that of the end far from the center.

Figure 3:
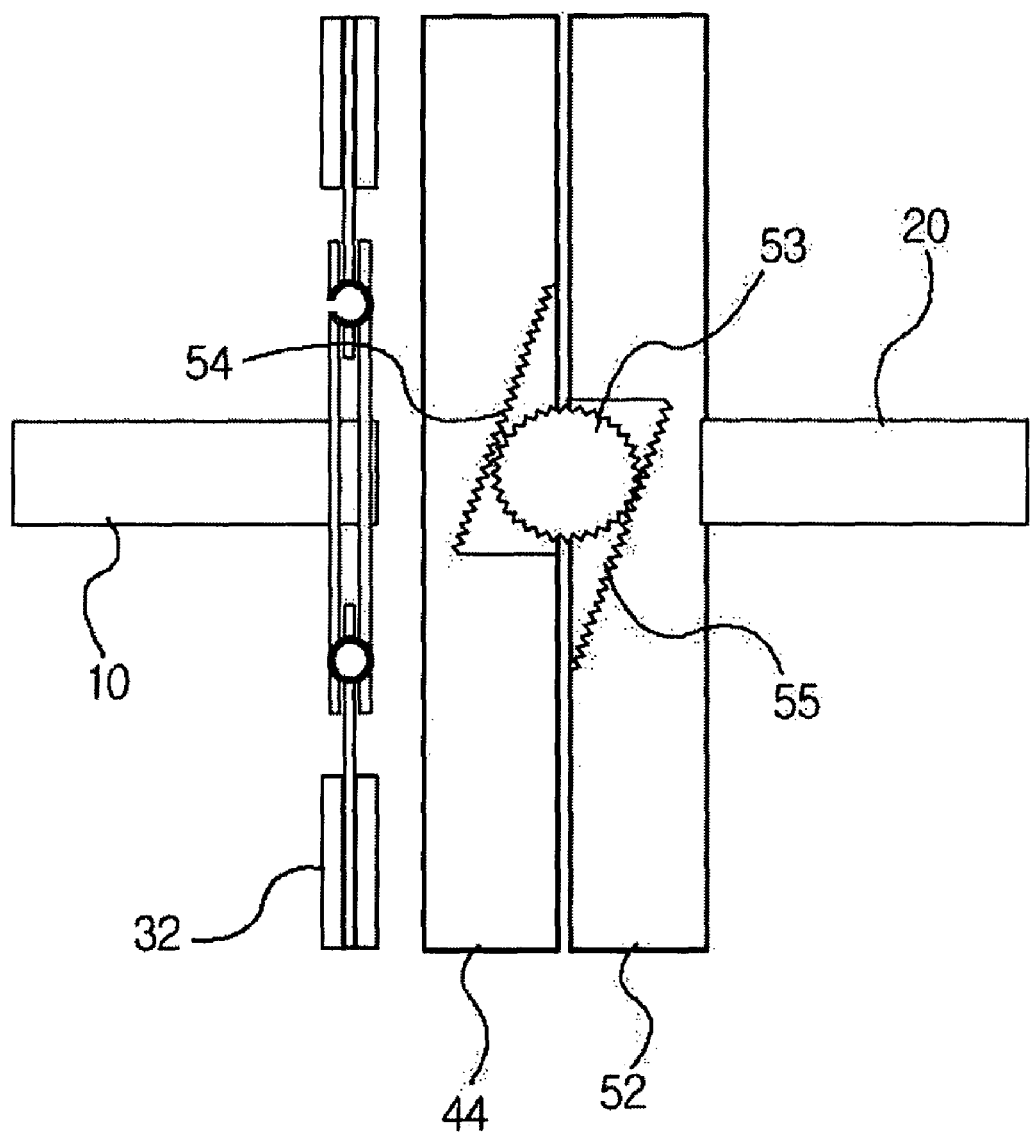
FIGS. 3 and 4 are views showing a gear section generating a self-energizing effect in accordance with the present invention.
Figure 4:
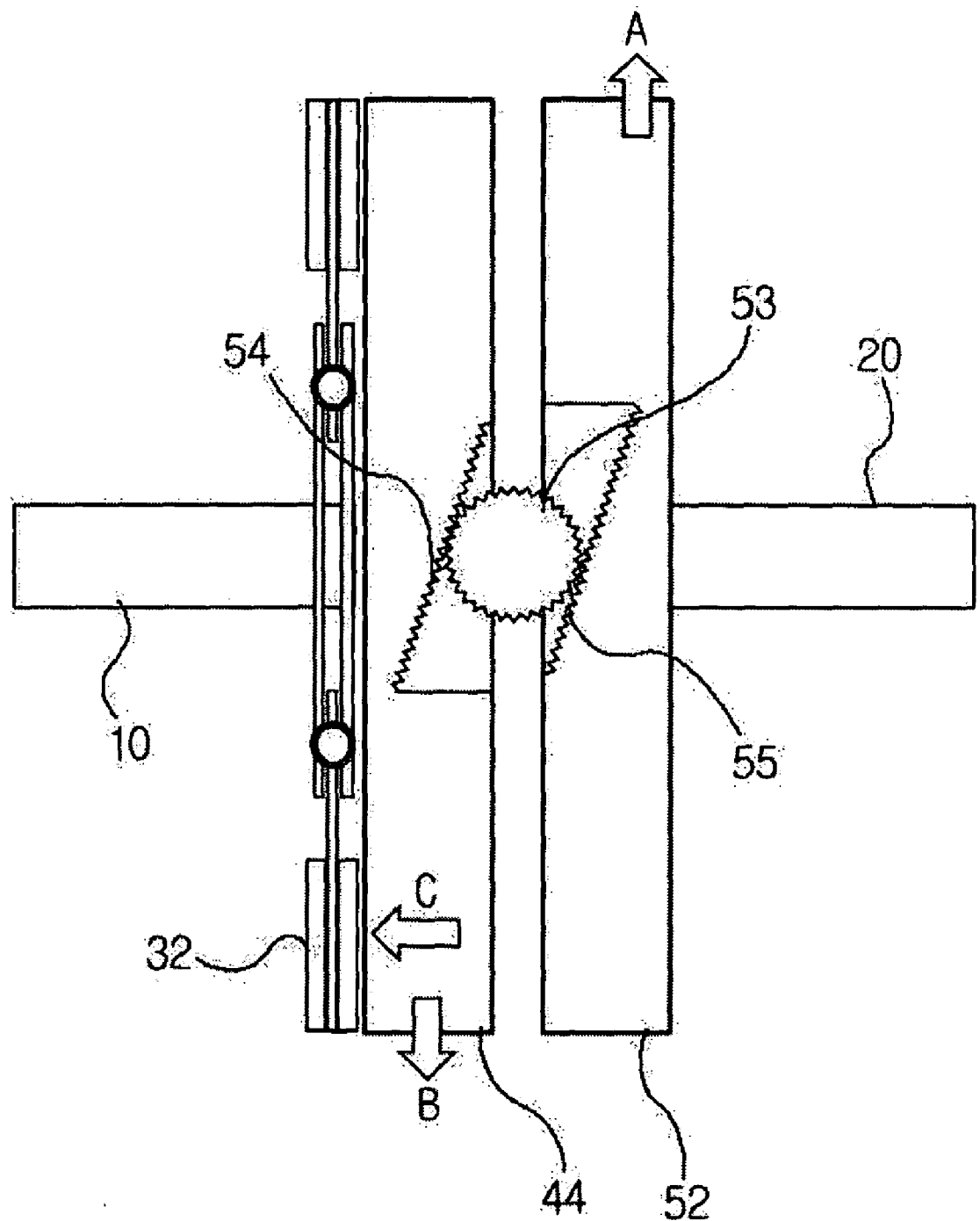

FIGS. 3 and 4 show disposition of the rack gears and the pinions at a release position and an engagement position of the respective clutches, respectively. As shown, the inclined surface of the first rack gear 55 provided at the operation disk 52 is formed to move the rotary shaft of the pinion 53 in a direction away from the operation disk 52 when the operation disk 52 is shifted from the release position of the clutch to the engagement position of the clutch. The inclined surface of the second rack gear 54 provided at the push member 44 is formed to be parallel to the inclined surface of the first rack gear 55. In this case, when the operation disk is shifted from the release position to the engagement position of the clutch, a distance between the surface of the push member 44 and the rotary shaft of the pinion 53 increases.

When the operation disk 52 is shifted from the release position shown in FIG. 3 to the engagement position rotated in an arrow direction shown in FIG. 4, the first rack gear 55 moves in a rotation direction of the operation disk 52, maintaining a predetermined distance from the driven shaft 20. When the first rack gear 55 moves, the pinion 53 engaged therewith is rotated along the inclined surface of the first rack gear 55. At this time, the rotary shaft of the pinion 53 moves in a direction away from the operation disk 52. The second rack gear 54 engaged with the pinion 53 moves in a direction opposite to the rotation direction of the operation disk 52, maintaining a predetermined distance from the driven shaft 20. Therefore, the push member 44 having the second rack gear 54 moves in a direction away from the operation disk 52, rotating in a direction opposite to the rotation direction of the operation disk 52. At this time, the rotation direction of the push member 44 is set to be the same rotation direction as the drive friction disk 32. This is to obtain the self-energizing effect, which will be described below in detail.

When the gear module of the rack gears 54 and 55 and the pinions 53 is substantially small, the clutch may be smoothly operated. In addition, since the rack gears 54 and 55 and the pinions 53 are engaged with each other, it is possible to prevent them from malfunctioning due to their slide movement.

Figure 5:
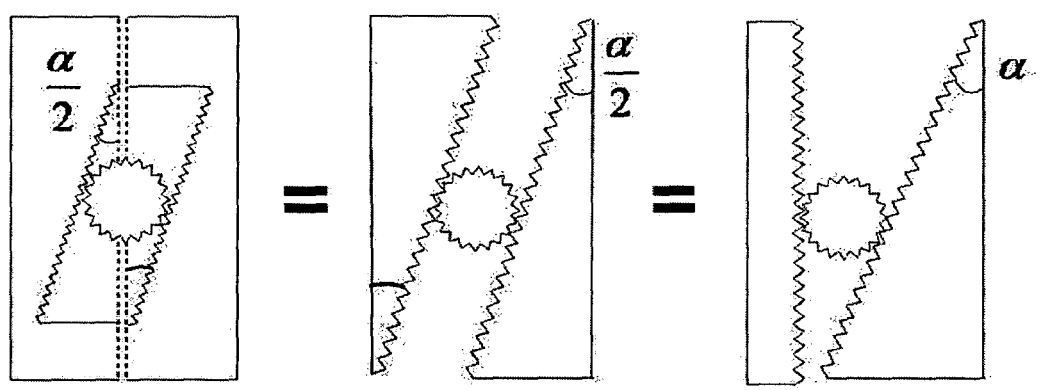
FIG. 5 is a view showing a self-energizing structure in accordance with the present invention.

As shown in FIG. 5, the respective rack gear is configured to have a surface inclined at a predetermined angle ($\alpha/2$) with respect to the surface of the push member 44 or the operation disk 52. It is operated in the same manner in which one rack gear is provided at a flat surface and the other rack gear is formed to have an angle ($\alpha$) of two times with respect to the surface. Therefore, for example, the rack gear adjacent to the push member 44 may be formed to be parallel to the surface of the push member, and the inclined surface of the rack gear adjacent to the operation disk 52 may have an angle ($\alpha$) of two times. However, in this case, since the rack gear provided at the operation disk 52 has a surface more inclined inward the operation disk 52, there is a need to increase the thickness of the operation disk 52 to accommodate the rack gear.

The respective rack gears are provided at the operation disk 52 and the push member 44 to have a surface inclined inward the surfaces of the respective members. Therefore, since the respective pinions 53 are supported by the rack gears, the pinions 53 are not separated outside the clutch apparatus even when a centrifugal force is applied to them.

Meanwhile, since the rack gears and the pinions 53 are provided in plural, if the teeth of the rack gears and the pinions 53 are not uniformly machined, any one of the pinions 53 may be rotated by a different angle from the other pinions 53. In this case, the push member 44 may unevenly apply a force against the driven friction disk 42 or may apply an unnecessary load to the driven shaft 20. Therefore, in order to solve the above problems, the respective pinions 53 may be interlocked to be rotated by the same angle. According to the mechanical structure provided in this embodiment, since a relative position of the respective pinions 53 are uniformly maintained, the rotational angles of the pinions 53 may be equal when they are operated. Therefore, pinion center shafts 56 extending along the center axes of the pinions 53 and ring-shaped members (not shown) configured to accommodate the pinion center shafts 56 are provided as interlocking members configured to interlock with the respective pinions 53. Since the center shafts 56 of the respective pinions 53 are accommodated in the ring-shaped members, the relative position thereof can be uniformly maintained. Therefore, when any one pinion 53 is rotated by a predetermined angle, all the other pinions 53 are also rotated by the angle. The operation disk 52 is driven to be rotated by a driver including a motor. The driver includes a motor, a first movement direction conversion mechanism, a release member 72, and a second movement direction conversion mechanism configured to convert linear movement of the release member 72 into rotation.

The first movement direction conversion mechanism converts rotation of the shaft of the motor into linear movement. For example, a worm gear is provided at the shaft of the motor, and a guide block 82 having a cylindrical shape linearly moves along the shaft of the motor when the worm gear 182 is rotated. The guide block has a hollow portion, and a gear train is provided at an inner surface of the hollow portion to be engaged with the worm gear 182.

The release member 72 is movably disposed on the driven shaft 20 to be moved by the first movement direction conversion mechanism in an axial direction thereof. Since the release member 72 linearly moves along the driven shaft 20, it is difficult to serially couple the release member 72 to the worm gear 182 of the motor due to disposition of the member. Therefore, the release member 72 is connected to the guide block 82 through a lever 92. Linear movement of the guide block 82 may be increased by appropriately selecting a support point of the lever 92 to be transmitted to the release member 72.

The second rotation conversion mechanism receives axial movement of the release member 72 to rotate the operation disk 52. For this purpose, the second movement direction conversion mechanism includes a guide pin 62 configured to move in the same direction as the release member 72 and a groove 64 configured to receive the guide pin 62 to allow slide movement thereof. The groove 64 is provided on a surface of the cylinder member 66 inclined with respect to the movement direction of the guide pin 62 and interlocked with the operation disk 52. As described above, since the operation disk 52 cannot move in the axial direction of the driven shaft but can be rotated only, the cylinder member 66 can also be rotated only, not moving in the axial direction. The guide pin 62 is provided at a guide member that can move along the driven shaft 20 in the axial direction and connected to the release member 72 via a bearing. Since the groove 64 is inclined with respect to the guide pin 62, when the guide pin moves along the driven shaft 20, the cylinder member 66 is rotated about the driven shaft 20. When the cylinder member 66 is rotated, the operation disk 52 interlocked with the cylinder member 66 is also rotated in the same direction.

The operation disk 52 and the push member 44 may be coupled to each other via a resilient member 46 such as a spring. The resilient member 46 helps easily operate the clutch when the clutch is shifted from the engagement position to the release position. In addition, when the clutch is at the engagement position, the resilient member 46 applies an appropriate recovering force between the push member 44 and the operation disk 52 such that the push member 44 cannot be excessively rotated to prevent the clutch from locking.

Hereinafter, the operation of the clutch in accordance with the exemplary embodiment of the present invention will be described.

When the clutch is shifted from the release position shown in FIG. 1 to the engagement position shown in FIG. 2, the guide block 82 moves in a rightward direction of the drawings according to rotation of the motor shaft. Movement of the guide block 82 is transmitted to the release member 72 through the lever 92 so that the release member 72 moves in a leftward direction of the drawings. The guide member connected to the release member 72 through the bearing and the guide pin 62 provided therein also move in a rightward direction of the drawings. When the guide pin 62 moves in a leftward direction of the drawing, the groove 64 configured to accommodate the guide pin 62 and the cylinder member 66 having the groove 63 are rotated. Since the cylinder member 66 is interlocked with the operation disk 52, the operation disk 52 is also rotated in the same rotation direction of the cylinder member 66. The rotation direction of the operation disk 52 is shown as an arrow of FIG. 4.

When the operation disk 52 is rotated, the first rack gear 55 moves with maintaining a predetermined distance from the driven shaft 20. Therefore, the pinion 53 engaged with the first rack gear 55 is rotated. When the pinion 53 is rotated, the second rack gear 54 engaged with the pinion 53 also moves with maintaining a predetermined distance from the driven shaft 20. Since the second gear 54 is provided in the push member 44, the push member 44 rotates as the second rack gear 54 moves. Meanwhile, since the first rack gear 55 and the second rack gear 54 has the inclined surfaces with respect to the surface of each member, the push member 44 moves along the driven shaft 20 in a direction away from the operation disk 52 as the pinion is rotated. The rotation direction and movement direction of the push member 44 is shown in FIG. 4.

When the push member 44 moves along the driven shaft 20, the driven friction disk 42 is pressed against the drive friction disk 32. Therefore, when the torque generated by the friction force is transmitted from the drive friction disk 32 to the driven friction disk 42, and is also transmitted to the driven shaft 20 splined to the driven friction disk 42.

Meanwhile, when the driven friction disk 42 is rotated, the push member 44 is also rotated in the same direction, and the operation disk 52 engaged with the rack gear via the pinion 53 is also rotated in the same direction as the drive shaft 10. While the operation disk 52 receives a force in a direction away from the push member 44 due to the self-energizing effect, which will be described, such movement is restrained by the support of the operation disk 52. Therefore, a bearing is interposed between the operation disk 52 and the support of the operation disk 52 such that the operation disk 52 can be smoothly rotated. In addition, when the operation disk 52 is rotated, the cylinder member 66 having the groove 53 interlocked therewith and the guide member 68 having the guide pin 62 accommodated in the groove 64 are also rotated. Therefore, a bearing is also interposed between the guide member 68 and the release member 72.

When the driven friction disk 42 is pressed against the drive friction disk 32 by the push member 44, the driven friction disk 42 receives torque in the rotation direction of the drive shaft 10 by the drive friction disk 32, and the push member 44 pressing the driven friction disk 42 also receives torque in the same direction. When the push member receives torque in the rotation direction of the drive shaft 10, the second rack gear 54 moves and then the pinion 53 and the first rack gear 55 are sequentially operated. Even though the sequential operation must increase a distance between the push member 44 and the operation disk 52, since the axial movement of the operation disk 52 is restrained, the push member 44 moves toward the driven friction disk 42. Therefore, a force of pressing the push member 44 against the driven friction disk 42 further increases. That is, when the push member 44 receives a small normal force to be shifted into the engagement position, a self-energizing effect is generated by the operation of the members to increase the magnitude of the vertical force. As a result, even when a relatively small magnitude of torque is applied by the motor, a sufficient magnitude of normal force may be applied between the drive friction disk 32 and the driven friction disk 42. Adjusting the material characteristics of the friction disk, a rotation angle of the inclined surface, initial position, a movement range of the rack gear, etc., it is possible to adjust the ratio of output torque to input torque of the motor.

When the clutch is shifted from the engagement position to the release position, an operation in the opposite direction is performed. That is, the guide block 82 moves in a leftward direction of the drawing according to rotation of the motor shaft. Therefore, the release member 72 and the guide member move in a rightward direction of the drawings. When the guide pin 62 of the guide member moves in the rightward direction of the drawing, the cylinder member 66 having the groove 64 configured to accommodate the guide pin 62 and the operation disk 52 are rotated in a direction opposite to the arrow shown in FIG. 4.

When the operation disk 52 is rotated, the first rack gear 55 moves, and the pinion 53 engaged with the first rack gear 55 is rotated in a direction opposite to the direction by which the release direction is converted to the engagement position. When the pinion 53 is rotated, the second rack gear 54 engaged with the pinion 53 moves, and the push member 44 is rotated in a direction opposite to the direction shown in FIG. 4. In addition, the push member 44 moves along the driven shaft 20 in a direction approaching the operation disk 52 (a direction opposite to the direction shown in FIG. 4).

When the push member 44 moves in the direction approaching the operation disk 52, the engagement of the driven friction disk 42 with the drive friction disk 32 is released, and no torque is transmitted from the drive friction disk 32 to the driven friction disk 42. The resilient member 46 helps the push member 44 move in the direction approaching the operation disk 52.

When the clutch is shifted from the engagement position to the release position, a self-deenergizing effect is applied such that the clutch is readily released, not being locked. When the clutch apparatus in accordance with the present invention is applied to a dual clutch transmission in which one clutch is clamped when the remaining clutch is released by the self-deenergizing effect, it may be optimized. That is, when operation torque is applied only to the clutch shifted to the engagement position, the opposite clutch may be readily released even when a force to shift the clutch to the release position is not additionally applied.

In addition, in the clutch apparatus in accordance with the exemplary embodiment of the present invention, the rotation direction of the push member 44 upon shift of the clutch to the engagement position is equal to a relative rotation direction of the drive friction disk 32 to the push member 44 to generate a self-energizing effect and thus ensure the operation of the clutch. When relative rotation directions of the two members are different from each other, the clutch may be rapidly and readily released by the self-deenergizing effect. Therefore, when the drive shaft 10 of the clutch apparatus in accordance with the exemplary embodiment of the present invention is rotated in one direction, the clutch apparatus transmits drive torque with maintaining the engagement position, and thus, the clutch apparatus functions as a one-way clutch when the drive shaft 10 is rotated in a direction opposite to the movement direction of the push member 44.

Figure 6:
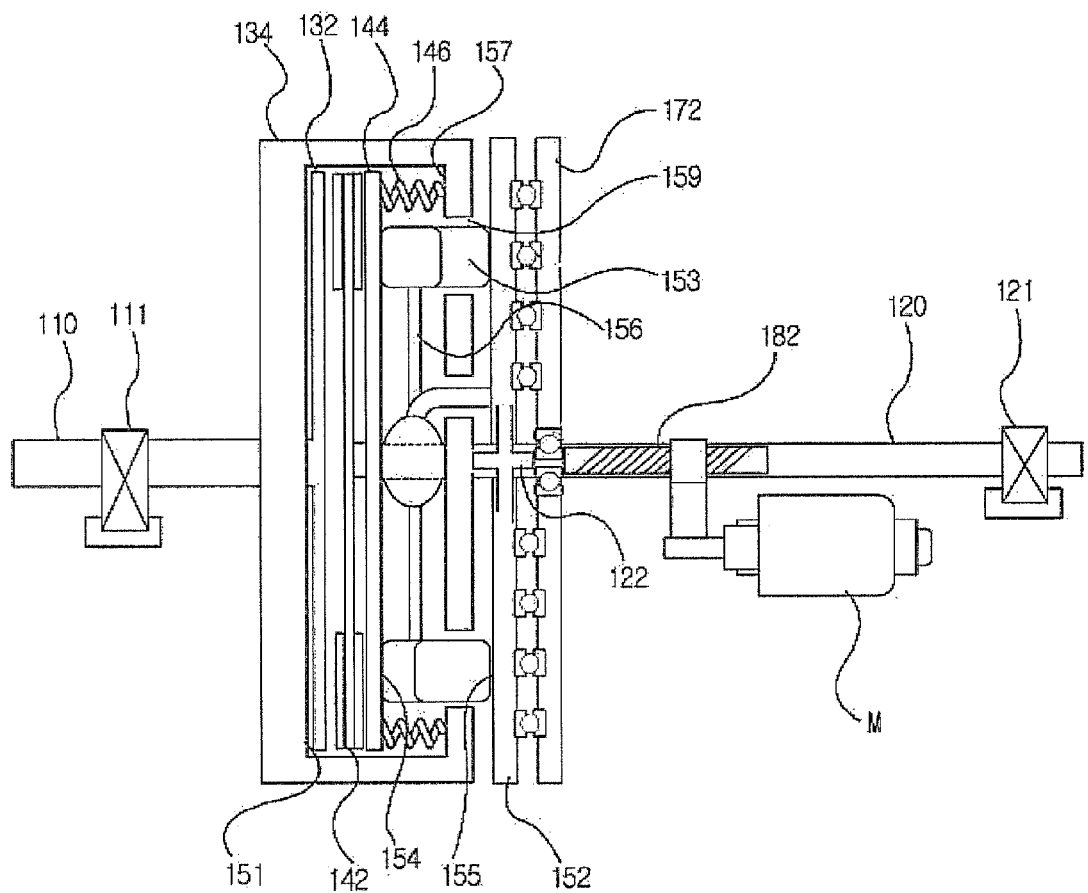
FIGS. 6 and 7 are views showing a clutch apparatus in accordance with another exemplary embodiment of the present invention.
Figure 7:
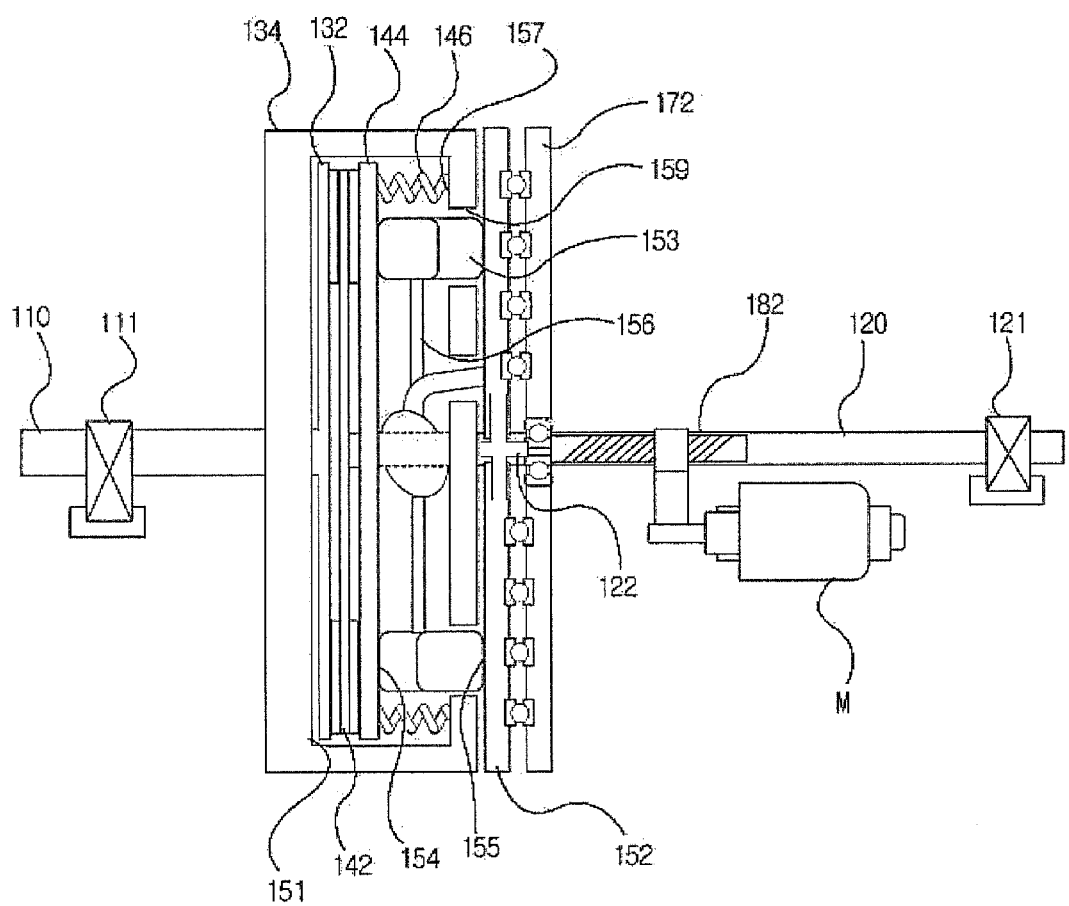

FIGS. 6 and 7 show a release position and an engagement position of a disk friction clutch apparatus in accordance with another exemplary embodiment of the present invention, respectively. The clutch apparatus includes a housing 134, a drive friction disk 132, a driven friction disk 142, a push member 144, an operation unit, and a motor M configured to drive the operation unit.

The drive friction disk 132 is connected to a drive shaft 110 and rotated in the same direction as the drive shaft 110. The driven friction disk 142 is connected to a driven shaft 120 to axially move with respect to the driven shaft 120. At the release position of the clutch shown in FIG. 6, the driven friction disk 142 is maintained spaced apart from the drive friction disk 132, and at the engagement position of the clutch shown in FIG. 7, the driven friction disk 142 is engaged with the drive friction disk 132 to receive torque from the drive friction disk 132 to transmit it to the driven shaft 120. For example, a spline 122 is provided in the driven shaft 120 such that the driven friction disk 142 can axially move along the spline 122 and transmit torque to the driven shaft 120.

The push member 144 is connected to the driven shaft 120 to be rotated and axially move with respect to the driven shaft 120. The push member 144 presses the driven friction disk 142 against the drive friction disk 132 at the engagement position of the clutch (see FIG. 7). As described above, the push member 144 has a disk shape and is connected to the driven shaft 120 via a bearing (not shown) to be rotated about the driven shaft 120.

The operation unit rotates the push member 144 at the release position of the clutch shown in FIG. 6 in the same rotation direction as the drive friction disk 132, and simultaneously, axially moves the push member 144 toward the driven friction disk 142 to shift the push member 144 to the engagement position of the clutch shown in FIG. 7. In addition, the operation unit has a self-energizing effect. That is, when the driven friction disk 142 applies a force to press the push member 144 in the rotation direction of the drive friction disk 132 at the engagement position of the clutch, a force by which the push member 144 presses the driven friction disk 142 increases.

The operation unit includes an operation disk 152, a non-spherical pinion 153 having legs connected to the operation disk 152, first and second rack gears 155, 154, and a driver having a motor.

The operation disk 152 is connected to the driven shaft 120 to move in an axial direction thereof. For this purpose, a spline 122 is provided between the driven shaft 120 and the operation disk 152. A plurality of legs extend from a circumference having a predetermined radius from a center of the operation disk 152, and the non-spherical pinion 153 is coupled to each leg. In order to stably operate the clutch apparatus, three or more non-spherical pinions 153 may be provided. In this embodiment, four non-spherical pinions 153 are illustrated. A pinion interlocking member 156 may be provided and configured to interlock the pinions 153.

The operation disk 152 is connected to the driven shaft 120 to move in an axial direction thereof. For this purpose, a spline 122 is provided between the driven shaft 120 and the operation disk 152. A plurality of legs extend from a circumference having a predetermined radius from a center of the operation disk 152, and the non-spherical pinion 153 is coupled to each leg. In order to stably operate the clutch apparatus, three or more non-spherical pinions 153 may be provided. In this embodiment, four non-spherical pinions 153 are illustrated.

A clutch housing accommodates the drive friction disk 132, the driven friction disk 142, and the non-spherical pinion 153. In addition, a plurality of first rack gears 155 are formed on a driven-side inner surface of the housing, i.e., a surface facing the push member 144, to be engaged with the respective non-spherical pinions 153. A drive-side inner surface of the housing supports the drive friction disk 132. Therefore, a distance between the drive friction disk 132 and the first rack gears 155 can be uniformly maintained by the drive-side inner surface and the driven-side inner surface of the housing.

Figure 8:
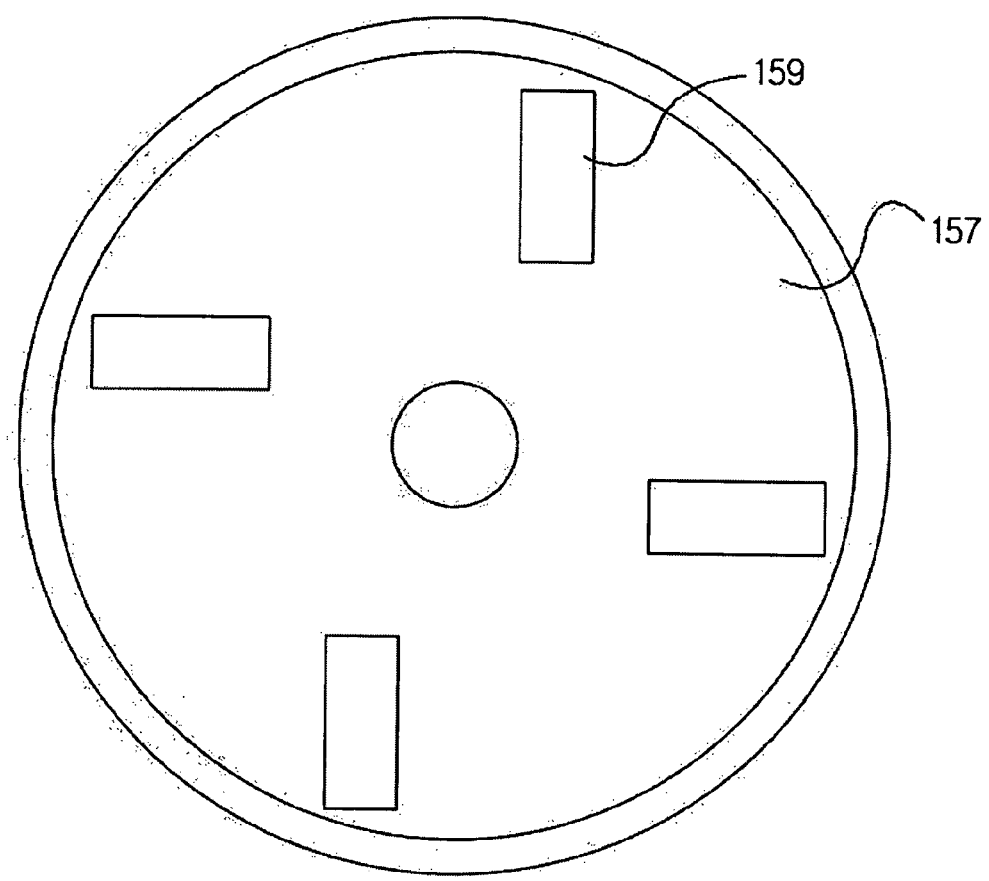
FIG. 8 is a view showing a front shape of a housing of a clutch apparatus in accordance with still another exemplary embodiment of the present invention.

FIG. 8 shows the driven-side inner surface of the housing. Openings are formed in the driven-side inner surface of the housing such that the legs of the non-spherical pinion 153 can pass therethrough. In this embodiment, four openings corresponding to the four non-spherical pinions 153 are formed. For example, the non-spherical pinions 153 have an oval cross-section. The non-spherical pinions 153 are disposed such that a gap between the first and second rack gears 154 and 155 at the release position of the clutch is smaller than that between the rack gears 154 and 155 at the engagement position of the clutch.

Second rack gears 154 are formed on a surface of the push member 144 facing the first rack gears 155. The second rack gears 154 are formed on a circumference having a predetermined radius from a center of the push member 144, and engaged with the respective non-spherical pinions 153. The same number of second rack gears 154 as the first rack gears 155 are formed on the surface of the push member 144.

Figure 9:
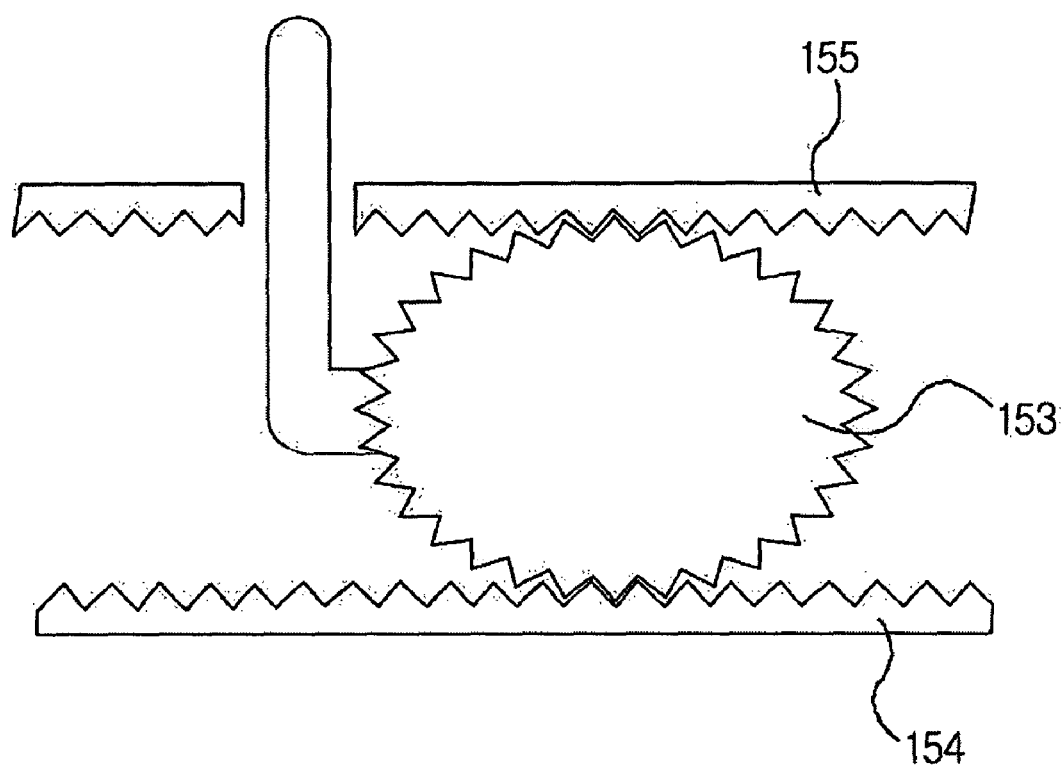
FIG. 9 is a view showing a gear section generating a self-energizing effect of a clutch apparatus in accordance with yet another exemplary embodiment of the present invention.

The non-spherical pinions 153 are disposed between the first rack gears 155 provided at the driven-side inner surface of the housing and the second rack gears 154 provided at the push member 144. The respective pinions 153 maintain the engagement with the first and second rack gears 155 and 154, respectively. FIG. 9 shows that the non-spherical pinions 153 engaged with the first and second rack gears 155 and 154 are disposed therebetween.

When the operation disk 152 axially moves from the release position shown in FIG. 6 in a rightward direction of the drawing to be shifted to the engagement position shown in FIG. 7, the non-spherical pinions 153 are rotated by a predetermined angle along the first rack gears 155. That is, since the non-spherical pinions 153 are connected to the operation disk 152 via legs, when the operation disk 152 moves toward the drive friction disk 132, the non-spherical pinions 154 connected to the operation disk via the legs are rotated. When the non-spherical pinions 153 are rotated, the push member 144 having the second rack gears 154 is rotated to move in a direction away from the first rack gears 155, i.e., the driven-side inner surface of the housing. That is, when the non-spherical pinions 153 are rotated, the second rack gears 154 engaged therewith are moved, and the push member 144 is rotated according to movement of the second rack gears 154. At this time, the rotation direction of the push member 144 is set to be the same rotation direction as the drive friction disk 132. In addition, since the pinion 153 having a large diameter is in contact with the rack gear when the non-spherical pinion 153 is rotated, the push member 144 moves in a direction away from the driven-side inner surface of the housing having the first rack gears 155. Since the rack gear is engaged with the pinion 153, it is possible to prevent them from malfunctioning due to slide movement.

The operation disk 152 is driven to be rotated by the driver having the motor. The driver includes the motor, a movement direction conversion mechanism, and a release member 172.

The movement direction conversion mechanism converts rotation of the shaft of the motor into linear movement. For example, a worm gear rotated by the motor is provided, and a guide block 82 axially movable along the driven shaft 120 linearly moves along the worm gear 182 when the worm gear 182 is rotated.

The release member 172 is axially movably disposed on the driven shaft 120, and moves along in the axial direction by the movement direction conversion mechanism. For example, the release member 172 is connected to the guide block 82.

The driven-side inner surface of the housing and the push member 144 may be connected to each other via a resilient member 146 such as a spring. The resilient member 146 helps perform a release operation when the clutch is shifted from the engagement position to the release position. In addition, the resilient member 146 applies an appropriate recovering force to the push member 144 to prevent the clutch from locking when the clutch is at the engagement position.

Hereinafter, the operation of the clutch in accordance with the exemplary embodiment of the present invention will be described.

When the clutch is shifted from the release position shown in FIG. 6 to the engagement position shown in FIG. 7, the release member 172 moves toward the drive friction disk 132.

The operation disk 152 connected to the release member 172 via the bearing also moves in the same direction as the release member 172.

When the operation disk 152 moves, the non-spherical pinions 153 connected to the operation disk 152 via the legs are rotated along the first rack gears. In addition, when the non-spherical pinions 153 are rotated, the second rack gears 154 engaged with the pinions 153 move with maintaining a predetermined distance from the driven shaft 120. Since the second rack gears 154 are formed on the push member 144, the push member 144 is rotated according to movement of the second rack gears 154. Meanwhile, as the non-spherical pinions 153 are rotated, the diameter of the pinions 153 engaged with the rack gears is increased, and thus, the push member 144 moves along the driven shaft 120 in a direction away from the driven-side inner surface of the housing, i.e., toward the drive friction disk 132.

When the push member 144 moves along the driven shaft 120, the driven friction disk 142 is pressed against the drive friction disk 132. Therefore, the torque created by a friction force is transmitted from the drive friction disk 132 to the driven friction disk 142, and is also transmitted to the driven shaft 120 splined to the driven friction disk 142.

Meanwhile, when the driven friction disk 142 is rotated, the push member 144 is also rotated in the same direction, and the second rack gears 154 are moved. In addition, when the second rack gears 154 move, the non-spherical pinions 153 and the first rack gears 155, which are sequentially engaged with each other, also move. Therefore, the housing having the first rack gears 155 is rotated in the same direction as the drive shaft 110. In addition, the operation disk 152 connected to the non-spherical disk 153 is also rotated in the same direction as the drive shaft 110. Therefore, a bearing is interposed between the operation disk 152 and the release member 172 such that the operation disk 152 can be smoothly rotated. In addition, a bearing (not shown) is also interposed between the drive friction disk 132 and the drive-side inner surface of the housing, which supports the drive friction disk 132.

When the driven friction disk 142 is pressed against the drive friction disk 132 by the push member 144, the driven friction disk 142 receives torque in a rotation direction of the drive shaft 110 by the drive friction disk 132, and the push member 144 pressing the driven friction disk 142 also receives torque in the same direction. When the push member 144 receives torque in the rotation direction of the drive shaft 110, the second rack gears 154 are moved and the non-spherical pinions 153 are rotated. The non-spherical pinion 153 is in contact with the rack gear at its smallest diameter in a release state, and then, the diameter is increased as it rotates. Therefore, when the non-spherical pinion 153 is rotated, the first rack gear 155 must move in a direction away from the push member 144. However, since the first rack gear 155 is provided at the driven-side inner surface of the housing to restrain the axial movement, the push member 144 moves toward the driven friction disk 142. Therefore, a force that the push member 144 presses the driven friction disk 142 is increased to generate a self-energizing effect. As a result, even when a relatively small torque is applied by a motor, a substantial magnitude of normal force may be applied between the drive friction disk 132 and the driven friction disk 142.

When the clutch is shifted from the engagement position to the release position, the operation is performed in the opposite direction. That is, the release member 172 first moves in a direction away from the drive friction disk 132 as the motor shaft rotates. Therefore, the operation disk 152 connected to the release member 172 also moves in a direction away from the drive friction disk 132.

The non-spherical pinion 153 connected to the operation disk 152 via the legs is rotated in a direction of reducing a diameter thereof. When the non-spherical pinion 153 is rotated, the second rack gear 154 engaged with the pinion 153 is moved to be rotated in a direction opposite to the direction in which it is rotated when the push member 144 is shifted to the engagement position. In addition, the push member 144 moves along the driven shaft 120 in a direction approaching the driven-side inner surface of the housing.

When the push member 144 moves in a direction approaching the driven-side inner surface 57 of the housing, the engagement between the driven friction disk 142 and the drive friction disk 132 is released, and no torque is transmitted from the drive friction disk 132 to the driven friction disk 142. The resilient member 146 helps move the push member 144 in a direction approaching the operating disk 152.

When the clutch is shifted from the engagement position to the release position, the self-deenergizing effect is applied such that the clutch is not locked and readily released.

As can be seen from the foregoing, a novel clutch mechanism proposed by the present invention can fasten a clutch with a small force using a self-energizing effect.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A disk friction clutch apparatus using a self-energizing effect comprising:
    a drive friction disk connected to a drive shaft and rotated by the drive shaft;
    a driven friction disk connected to a driven shaft to axially move with respect to the driven shaft and configured to receive torque from the drive friction disk to transmit the torque to the driven shaft at an engagement position of the clutch;
    a push member connected to the driven shaft to be rotated about the driven shaft and move in an axial direction thereof, and configured to press the driven friction disk against the drive friction disk at the engagement position of the clutch; and
    a self-energizing operation unit configured to rotate the push member at a release position of the clutch in a first rotation direction and move the push member toward the driven friction disk in the axial direction to return the push member to the engagement position of the clutch, and to increase a force of the push member against the driven friction disk when the push member at the engagement position of the clutch is pressed to rotate in the first rotation direction from the driven friction disk,
    wherein the self-energizing operation unit includes:
    an operation disk configured to restrain axial movement with respect to the driven shaft and to allow rotation thereof;
    a plurality of first rack gears provided on a circumference having a predetermined radius from a center of the operation disk to form a surface inclined with respect to a surface of the operation disk facing the push member;
    a plurality of pinions engaged with the first rack gears to move along the inclined surface of the first rack gears;

a plurality of second rack gears provided on a circumference having a predetermined radius from a center of the push member to form a surface to inclined with respect to a surface of the push member facing the operation disk, which is parallel to the inclined surface of the first rack gears, and engaged with the pinions, respectively; and a driver configured to rotate the operation disk.

2. The disk friction clutch apparatus using a self-energizing effect according to claim 1, wherein the driver includes:
   a motor having a rotary shaft;
   a first movement direction conversion mechanism configured to convert rotation of the shaft of the motor into linear movement;
   a release member axially movably disposed on the driven shaft and axially moved by the first movement direction conversion mechanism; and
   a second movement direction conversion mechanism configured to receive axial movement of the release member to rotate the operation disk.

3. The disk friction clutch apparatus using a self-energizing effect according to claim 1, further comprising a pinion interlocking member configured to interlock the pinions such that the pinions simultaneously move along the inclined surface of the first rack gears.

4. The disk friction clutch apparatus using a self-energizing effect according to claim 3, wherein the pinion interlocking member includes:
   pinion center shafts extending along center axes of the respective pinions; and
   ring-shaped members configured to receive the center shafts of the respective pinions.

5. A disk friction clutch apparatus using a self-energizing effect comprising:
   a drive friction disk connected to a drive shaft and rotated by the drive shaft;
   a driven friction disk connected to a driven shaft to axially move with respect to the driven shaft and configured to receive torque from the drive friction disk to transmit the torque to the driven shaft at an engagement position of the clutch;
   a push member connected to the driven shaft to be rotated about the driven shaft and move in an axial direction thereof, and configured to press the driven friction disk against the drive friction disk at the engagement position of the clutch; and
   a self-energizing operation unit configured to rotate the push member at a release position of the clutch in a first rotation direction and move the push member toward the driven friction disk in the axial direction to return the push member to the engagement position of the clutch, and to increase a force of the push member against the driven friction disk when the push member at the engagement position of the clutch is pressed to rotate in the first rotation direction from the driven friction disk,
   wherein the self-energizing operation unit includes:
   an operation disk axially movably connected to the driven shaft;
   a plurality of non-spherical pinions connected to a plurality of supports extending from a circumference having a predetermined radius from a center of the operation disk toward the push member;
   a plurality of first rack gears disposed to face the push member and spaced apart a predetermined distance from the drive friction disk, and engaged with the respective non-spherical pinion gears;

a plurality of second rack gears provided on a circumference having a predetermined radius from the center of the push member on a surface of the push member facing the first rack gears, and engaged with the respective non-spherical pinion gears; and a driver configured to axially move the operation disk on the driven shaft.

6. The disk friction clutch apparatus using a self-energizing effect according to claim 5, wherein the driver includes:
   a motor having a rotary shaft;
   a first movement direction conversion mechanism configured to convert rotation of the shaft of the motor into linear movement; and
   a release member disposed to axially move on the driven shaft and rotate independently from the operation disk, and axially moved by the first movement direction conversion mechanism to axially move the operation disk.

7. The disk friction clutch apparatus using a self-energizing effect according to claim 5, further comprising a pinion interlocking member configured to interlock the pinions such that the pinions simultaneously move along the first rack gears.

8. The disk friction clutch apparatus using a self-energizing effect according to claim 7, wherein the pinion interlocking member includes:
   pinion center shafts extending along center axes of the respective pinions; and
   connection members configured to connect the center shafts of the respective pinions.

9. A disk friction clutch apparatus using a self-energizing effect comprising:
   a drive friction disk connected to a drive shaft and rotated by the drive shaft;
   a driven friction disk connected to a driven shaft to axially move with respect to the driven shaft and configured to receive torque from the drive friction disk to transmit the torque to the driven shaft at an engagement position of the clutch;
   a push member connected to the driven shaft to be rotated about the driven shaft and move in an axial direction thereof, and configured to press the driven friction disk against the drive friction disk at the engagement position of the clutch;
   an operation disk configured to restrain axial movement with respect to the driven shaft and allow rotation thereof;
   a plurality of first rack gears provided on a circumference having a predetermined radius from a center of the operation disk to form a surface inclined with respect to a surface of the operation disk facing the push member;
   a plurality of pinions engaged with the first rack gears to move along the inclined surface of the first rack gears;
   a plurality of second rack gears provided on a circumference having a predetermined radius from a center of the push member to form a surface inclined with respect to a surface of the push member facing the operation disk, which is parallel to the inclined surface of the first rack gears, and engaged with the pinions, respectively; and
   a driver configured to rotate the operation disk in a direction opposite to the rotation direction of the drive shaft when the clutch is shifted from the release position to the engagement position.

10. The disk friction clutch apparatus using a self-energizing effect according to claim 9, wherein the inclined surface of the first rack gears is inclined from the surface of the operation disk toward the interior thereof, and the inclined surface of the second rack gears is inclined from the surface of the push member toward the interior thereof.

11. The disk friction clutch apparatus using a self-energizing effect according to claim 9, wherein the driver includes:
   a motor having a rotary shaft;
   a first movement direction conversion mechanism configured to convert rotation of the motor into straight movement;
   a release member axially movably disposed on the driven shaft and axially moved by the first movement direction conversion mechanism; and
   a second movement direction conversion mechanism configured to receive axial movement of the release member to rotate the operation disk.

12. The disk friction clutch apparatus using a self-energizing effect according to claim 9, further comprising:
   pinion center shafts extending along center axes of the respective pinions; and
   ring-shaped members configured to receive the center shafts of the respective pinions and disposed between the push member and the operation disk.

13. A disk friction clutch apparatus using a self-energizing effect comprising:
   a drive friction disk connected to a drive shaft and rotated by the drive shaft;
   a driven friction disk connected to a driven shaft to axially move with to respect to the driven shaft and configured to receive torque from the drive friction disk to transmit the torque to the driven shaft at an engagement position of the clutch;
   a push member connected to the driven shaft to be rotated about the driven shaft and move in an axial direction thereof, and configured to press the driven friction disk against the drive friction disk at the engagement position of the clutch;
   an operation disk axially movably connected to the driven shaft; a plurality of non-spherical pinions connected to a plurality of supports extending from a circumference having a predetermined radius from a center of the operation disk toward the push member;
   a plurality of first rack gears disposed to face the push member and spaced apart a predetermined distance from the drive friction disk, and engaged with the respective non-spherical pinion gears;
   a plurality of second rack gears provided on a circumference having a predetermined radius from the center of the push member on a surface of the push member facing the first rack gears, and engaged with the respective non-spherical pinion gears; and a driver configured to axially move the operation disk on the driven shaft toward the drive friction disk when the clutch is shifted from the release position to the engagement position.

14. The disk friction clutch apparatus using a self-energizing effect according to claim 13, wherein the driver includes:
   a motor having a rotary shaft; a first movement direction conversion mechanism configured to convert rotation of the shaft of the motor into linear movement; and
   a release member disposed to axially move on the driven shaft and rotate independently from the operation disk, and axially moved by the first movement direction conversion mechanism to axially move the operation disk.

15. The disk friction clutch apparatus using a self-energizing effect according to claim 13, further comprising:
   pinion center shafts extending along center axes of the respective non-spherical pinions; and
   connection members configured to connect the respective pinion center axes to uniformly maintain a relative position of the non-spherical pinions.

* * * * *